Patented Nov. 8, 1938

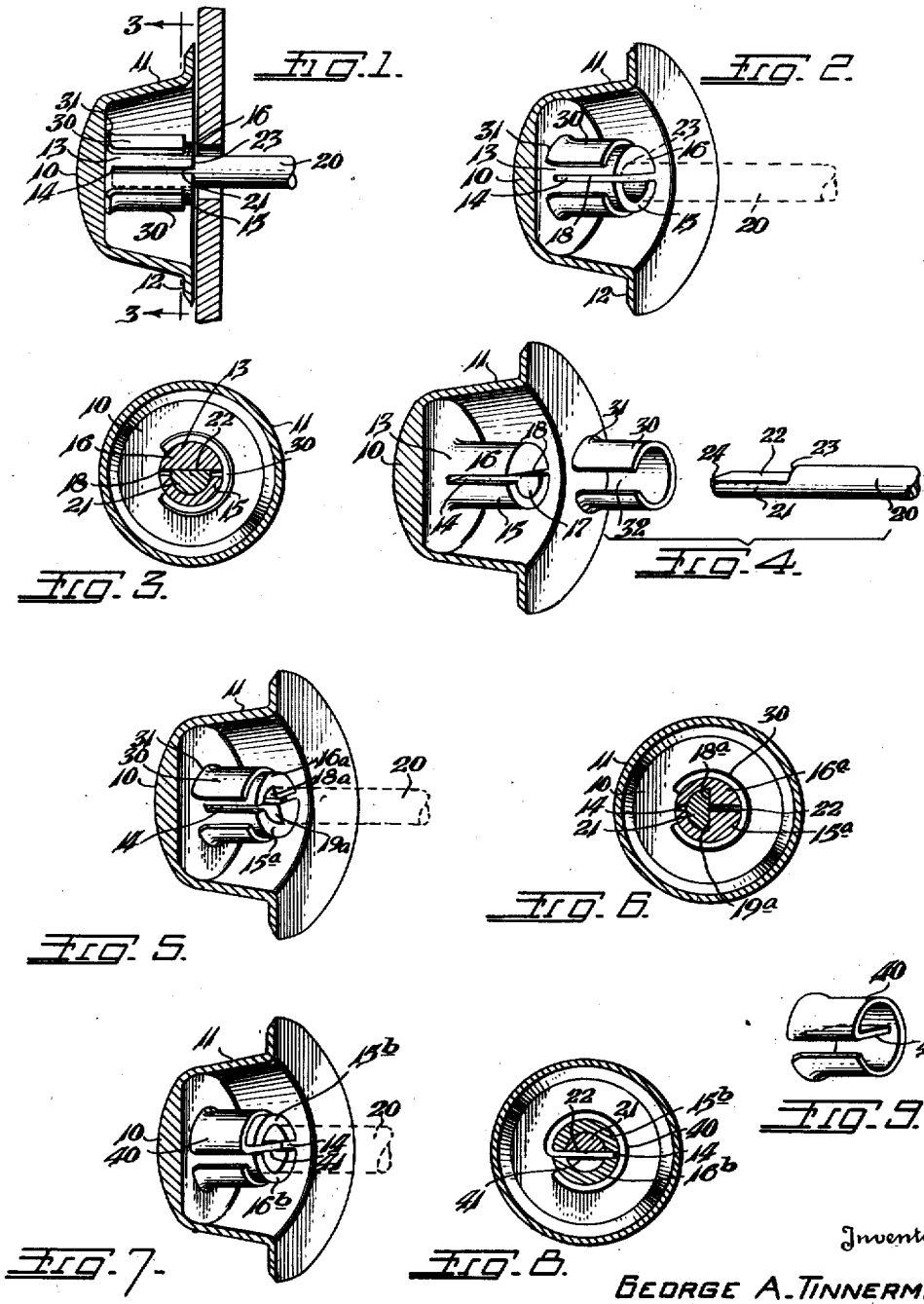

2,136,160

UNITED STATES PATENT OFFICE 2,136,160

MEANS FOR CONNECTING KNOBS TO SHAFTS

George A. Tinnerman, Rocky River, Ohio, assignor to Albert H. Tinnerman, Cleveland, Ohio Application December 13, 1937, Serial No. 179,536

4 Claims. (Cl. 287—53)

This invention relates to means for connecting knobs, handles and like parts to shafts, rods, spindles, etc., in fixedly held relation against rotative as well as axial movement whereby they may be effectually actuated in turning operations without resulting in looseness or side play in the connection.

More particularly, this invention deals with an arrangement for detachably connecting a plastic knob or like part to a shaft or spindle having use, for example, as the adjusting element of a control unit of a radio apparatus. A control element of this character is usually constructed in a one-piece device of thermo-plastic, insulating material such as resin, celluloid, synthetic rubber, etc. suitably formed by well known molding operations to the desired size and shape to include an integral connecting hub having a central bore adapted to receive a reduced end portion or stem of a cooperating shaft, rod or spindle.

In attaching such plastic knobs to shafts and spindles to be held against relative rotative movement or side play, it has been the recent practice to provide in the hub of the plastic part a socket opening having a flat side wall adapted for snug, close fit in engagement with a flat face of the cooperating shaft assembled therein. It is of course desirable that the knob be secured on the shaft against possible axial movement as well as rotative movement and to this end various anchoring or retaining means such as set-screws, spring friction and clutch devices, and the like, have been employed.

In any such arrangement the holding action provided is necessarily supplied by the binding or wedging action exerted by the anchoring means between the shaft or spindle and the inner sidewalls of the socket opening in the hub. And though such anchoring means have been employed somewhat satisfactorily in the connecting means for knobs constructed of hard plastic material such as Bakelite, hard rubber, etc. they are entirely unsatisfactory for use with parts constructed of semi-plastic material such as Tenite, and the like, which material is relatively soft and otherwise has the property commonly known in the trade as "cold flow". Such semi-plastic parts are possessed of characteristics which make them more useful and advantageous in certain application than the more common type of materials, these characteristics, among others, being exceptional beauty, unusual dielectric properties, relatively high impact strength, high heat resistance, chip-, rust-, corrosion-, and shatter proofness, and unusual malleability which permits the same to be readily worked, as by turning and cutting, into any desired shape or configuration.

It is the property of "cold flow" which has heretofore made it most difficult and in many applications prohibitive to provide an effective, satisfactory and inexpensive means for connecting a plastic knob or like part to a shaft in such manner as to be secured against both axial and rotative movement. It may be readily understood that inasmuch as semi-plastic material, such as Tenite, has the property of "cold flow", any form of anchoring or retaining means exerting a binding or wedging action between the shaft and the side-walls of the socket is unsatisfactory in that any such binding and wedging action must necessarily cause the semi-plastic material of the hub to spread and yield in and around the retaining means such that a truly tight, positive, and rigid connection is practically impossible and looseness and play in the connection is inevitable. Especially is this so in rotating the knob whereupon twisting strain is set up thereby causing the semi-plastic material of the side-walls of the socket in the hub to yield still further such that in time the knob becomes loose on the stem and often completely removed. Also, the use of set-screw retaining means for connecting such semi-plastic parts to a shaft has been found not only unsatisfactory but entirely impractical. A set-screw as used in an instrument knob requires a hole to receive a screw driver at one side of the instrument which, of course, is objectionable in that it detracts from the finished appearance of the knob. This arrangement also requires the boring of a separate hole in the hub of the plastic part, which hole must be tapped and the set screw laboriously threaded into the tapped hole. Naturally any such procedure is expensive in requiring several time consuming operations and is entirely unsatisfactory in that the threads provided easily cross and break down quickly when the set-screw is tightened due to the "cold flow" property of the semi-plastic material.

It is therefore an object of the present invention to overcome the insufficiencies of the prior art structures and provide a means for connecting a plastic part to a shaft, spindle or the like, which may be manufactured most economically, assembled quickly, and easily mounted upon or removed from a shaft without the use of tools and which mounting of the plastic part is efficient at all times and not subject to side play, looseness or wobble of any nature.

A further object of the invention is to provide a means for connecting a plastic part to a shaft or spindle, embodying a construction wherein neither the knob nor the shaft is materially weakened and separate, automatic retaining means is applied to the hub of the knob in such manner as to provide a continuously effective, rigid, clamping connection in which the knob is secured on the shaft against axial as well as rotative movement.

A more specific object contemplates the provision of a means for connecting a plastic part to a shaft having a reduced end portion or stem presenting a flat face adapted for snug, rigid engagement in a complementary socket opening provided in the cooperating hub sections on the plastic part under the compressive force of a spring collar device embracing the hub sections to urge the same toward continuously effective holding action with the shaft stem, thereby positively retaining the plastic part against rotative as well as axial movement in assembled relation on the shaft.

A still further object of the invention aims to provide in such a connecting means an arrangement whereby a plastic part may be adapted for use with any of several sizes of shafts, this procedure contemplating the provision, as by drilling, of a suitable socket in the hub of the plastic part to receive the selected shaft, and a spring retaining collar including a cross-piece bridging the socket opening, whereby the cross-piece presents a flat side-wall for snug non-rotative engagement with the flat face of the stem of the shaft to secure the same against relative rotative and axial movement.

Further objects and advantages of the invention will be readily apparent to those skilled in the art as a description thereof proceeds with reference to the accompanying drawing in which like reference characters designate like parts throughout the same, and in which:

Fig. 1 is a side view, partly in section, showing the improved connecting means of the invention as embodied in a panel knob for an instrument control shaft;

Fig. 2 is a perspective, partly in section, showing the assembly of the knob with the instrument control shaft by the improved connecting means of the invention, the shaft being represented by dotted lines;

Fig. 3 is a section taken on line 3—3 of Fig. 1 looking in the direction of the arrows;

Fig. 4 is a perspective showing details of construction of the several parts of the assembly comprising a knob, shown partly in section, a retaining collar, and an instrument control shaft having a reduced end portion or stem;

Fig. 5 is a perspective, partly in section, of an assembly showing a further embodiment of the invention, the shaft being represented by dotted lines;

Fig. 6 is a vertical section of an assembly such as represented in Fig. 5 showing the details of the construction of the connecting means;

Fig. 7 is a perspective, partly in section, of an assembly of a still further embodiment of the invention, the shaft being represented in dotted lines;

Fig. 8 is a vertical section of an assembly such as represented in Fig. 7 showing the details of the construction of this form of the connecting means; and, Fig. 9 is a perspective of the retaining collar per se employed in the embodiment of the invention illustrated in Figs. 7 and 8.

In the embodiment of the invention disclosed in Figs. 1 to 4 inclusive, there is shown by way of illustration, an application of the connecting means of the invention as employed in a conventional panel knob for an instrument control shaft in a radio apparatus, for example. In the present example, the knob designated generally 10, is molded of plastic material in a one piece device of suitable size and shape. Preferably the knob is substantially annular in outward appearance and cup-shaped in section to provide an imperforate body 11 and, if desired, a peripheral flange 12 on which may be formed dial graduations, pointers, symbols and similar indicating means in a well known manner. Integrally formed within the knob in the molding operation, is a hub 13 serving as a means for connecting the knob to the shaft, it being quite obvious that this hub may assume any suitable form or shape and may, if desired, comprise the center area of a plastic part molded solid throughout. As best seen in Fig. 4, the said hub is slotted as at 14 to provide opposed, cooperating and relatively yieldable hub sections 15, 16, the said slot being provided preferably in the molding operation, or in any other suitable manner thereafter as by sawing. To provide the desired opening for receiving the shaft, one of the complementary sections 15 is formed with a longitudinally extending, substantially semi-circular recess 17 which, together with the opposed flat face of the cooperating hub section 16, presents a substantial D-shaped socket comprising a straight side-wall 18.

It will be appreciated therefore, that the D-shaped socket opening thus provided in the hub, is admirably suited for detachably and non-rotatably receiving an end of a control shaft 20, Fig. 4, which is suitably cutaway to provide a stem 21 of D-shaped cross-section corresponding substantially to that of the socket and comprises a flat face 22, a shoulder 23 at the inner end of the said face, and a tapered extremity 24 facilitating ready application of the stem into the socket opening. The cross-sectional area of the D-shaped stem 21 is preferably a few thousandths greater than that of the D-shaped socket opening such that on being applied thereto, there is a wedging action of the stem in the socket which, in the initial assembled relation of the knob and stem, serves to eliminate all lost motion or play. It will be remembered however, that the material of the knob is semi-plastic and subject to "cold-flowing" wherefore the plastic material of the side-walls of the socket opening tends to collapse and spread upon the application of force in a turning movement which in heretofore known connecting means has resulted in faulty, loose connections in which there is objectionable side play and wobble. In order to guard against any such "cold flowing" of the semi-plastic material, a retaining means comprising a spring collar, presently to be described, may be employed most effectively in a manner to embrace the cooperating hub sections 15, 16 to supply a compressive force thereto thereby continually urging the side-walls of the socket opening into firm, snug, rigid engagement with the stem of the shaft and otherwise reinforcing the plastic material of said sections against any tendency toward "cold flowing" which would result in looseness and side play in the connection.

The retaining means for holding the stem in assembled relation between the cooperating hub sections comprises preferably a simple, inexpensive spring collar device 30 having the peripheral edge thereof suitably flared to facilitate application thereof to retaining position embracing the hub section 15, 16. As shown in the present example, the spring collar is annular to snugly receive the semi-cylindrical hub sections and is also split as at 32, Fig. 4, to provide for ready expansion thereof in the assembling operation. It is quite obvious however, that the spring collar may be of any suitable section to correspond to the combined area of cooperating hub sections in whatever form they may be; it is also obvious that the spring collar need not be split, in which instance it may be formed in the manner of a hollow truncated cone to provide for any required flexibility therein. In this respect, it is fully contemplated that the teachings of this invention be embodied in installations in which the spring collar is exposed to view whereupon the same may be provided with a chrome finish or the like to present an ornamental and artistic appearance.

In practice, it will be understood that the elements comprising the connecting means in the embodiment just described are readily assembled in an installation simply by snapping the spring collar 30 to yieldably embrace the hub sections 15, 16 substantially as shown in Fig. 2, the flared peripheral edge 31 thereof naturally facilitating this operation. The stem 21 of the shaft, by virtue of its tapered extremity 24, may then be readily introduced into the socket opening with its flat face 22 in snug frictional engagement with the flat side-wall 18 and the shoulder 24 thereof in abutting relation with the adjacent end surface of the hub section 16, in which relation the rigidity of the connection is materially enhanced.

In another procedure the stem 21 of the shaft may be first introduced in a similar manner into the socket opening presented by the relatively yieldable hub sections 15, 16, whereupon the spring collar is readily applied to embrace the hub sections to complete the assembly. Thus, in any procedure, the spring collar serves in its final applied position to supply compressive force to the semi-plastic material of the hub sections and thereby continuously urge the side-walls of the socket opening into firm, snug, rigid, engagement with the stem of the shaft at all times. In this way, even though the material of the knob is semi-plastic and naturally subject to "cold flow", the connection at all times is rigid, positive and most efficient and any tendency thereof to become loose is minimized to the extent that side-play and wobble of the knob in assembled relation on the shaft is practically impossible.

Figs. 5 and 6 show a further embodiment of the invention in which the number of parts of the connecting means and the assembly and operation thereof in an installation is substantially similar to that described above with reference to Figs. 1-4 inclusive. As shown in Fig. 5, the hub sections 15a, 16a are each longitudinally recessed to provide therebetween the D-shaped socket opening comprising flat side-wall sections 18a, 19a, adapted for firm, snug, frictional and non-rotative engagement with the flat face 22 of the D-shaped shaft stem 21 when assembled therein. Thus it will be understood that in this form of invention the opposed hub sections are so designed as to cooperate in engaging, more particularly, the corners of the D-shaped stem from either side thereof, as shown in Fig. 6, to hold the knob on the shaft against rotative as well as axial movement under the compressive force of the spring collar 30.

In certain instances it is most desirable that the hub on the plastic part be molded solid in order that it may thereafter be readily drilled or bored to provide a socket opening adapted to receive the D-shaped stem of any of several sizes of shafts. In Figs. 7-9 inclusive there is disclosed an arrangement by which the several parts in such a connecting means may be most effectively fitted in a procedure requiring only an expedient change in the construction of the spring retaining collar. Accordingly, assuming that the hub in a plastic knob is molded solid and with the conventional slot 14 providing the cooperating relatively yieldable hub sections 15b, 16b, any desired size of a socket opening may be prepared in the hub by a simple boring or drilling operation to provide a round hole having a cross-sectional area preferably a few thousandths less than that of the shaft to be employed. However, since the shaft includes a D-shaped stem in the usual manner providing for positive turning movement in the connection, it is necessary that an element presenting a flat side-wall in the socket opening be provided. As shown in Fig. 8, such an element may be readily provided in the spring collar 40 in the manner of an inwardly extending cross-piece 41. Referring to the assembly represented in Fig. 7, it will be seen that a spring collar of this form may be applied to embrace the hub sections 15b, 16b in the usual manner with the cross-piece 41 received in the slot 14 and bridging the round hole between the hub sections to present a socket opening having the necessary flat side-wall adapted for snug, rigid frictional engagement with the flat face 22 of the D-shaped stem of the shaft when fitted thereinto substantially as shown in Fig. 8. Thus, in this form of the invention also, the connecting means provided ensures that the stem of the shaft will be held, at all times, in rigid connected relation with the plastic knob under the compressive force of the spring collar embracing the hub sections thereby providing for a continuously effective, automatic, frictional gripping action of the hub sections with the stem of the shaft to prevent the slightest rotative as well as axial movement in the operation of the knob.

From the foregoing description, it will be understood that the connecting means of the instant invention, in any embodiment, provides a most simple, inexpensive construction in which a knob or like plactic part is easily and quickly assembled on a shaft to automatically grip the shaft in a continuously effective clamping action of the hub sections against relative axial movement. And since in any embodiment, the shaft is provided with a stem having a flat face adapted for snug, cooperative engagement with a flat side-wall in the socket opening, the knob is retained in rigid frictional engagement on the shaft against rotative as well as axial movement.

It will be further appreciated that in any embodiment of the invention, the construction is such as to be admirably suited for connecting semi-plastic parts by virtue of the spring collar device which serves to exert a continuous clamping action on the hub sections to firm gripping relation with the shaft at all times, in which relation any tendency toward "cold flow" naturally acts to bind the side-walls of the socket opening with the shaft and thereby provide an even more effective, rigid, positive, connection.

Although the description and drawing disclose the invention as applied to a panel knob such as used in radio apparatus, for example, it will be understood that the connecting means are also applicable wherever an operating member is to be mounted by sliding over the end of a shaft for the purpose of transmitting or receiving a relatively small torque.

And while the invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive the scope of the invention being indicated by the appended claims rather than by the foregoing description, and all changes which come within the meaning and range of equivalency of the claims are therefore intended to be embraced therein.

What is claimed is:

1. Means for connecting a plastic knob or other plastic body to a shaft, said means comprising an integral connecting hub provided on the plastic body in the form of cooperating hub sections having a socket opening for receiving the shaft, and a spring collar device embracing the hub sections to urge the same to frictional clamping engagement with the shaft, said spring collar device serving to bolster the plastic material of the hub sections in such clamping engagement with the shaft thereby preventing looseness and play in the connection incident to strain taking place therein.

2. Means for connecting a plastic knob or other plastic body to a shaft, said means comprising an integral connecting hub provided on the plastic body in the form of cooperating hub sections having a socket opening for receiving the shaft, said socket opening including a flat side wall and said shaft being formed with a flat side face having cooperative relation with said flat side wall of the socket opening in assembled relation therein, and a spring collar device embracing the hub sections to urge the same to firm, gripping connected engagement with the shaft, said spring collar device serving to bolster the plastic material of the hub sections and maintain said flat side wall of the socket opening in clamping engagement with the flat side face of the shaft thereby preventing looseness and play in the connection incident to strain taking place therein.

3. Means for connecting a plastic knob or other plastic body to a shaft, said means comprising an integral connecting hub member provided on the plastic body in the form of a pair of relatively yieldable, cooperating hub sections, a recess in each said hub section providing a socket opening having a flat side wall, said shaft having a flat face adapted for cooperative engagement with said flat side wall of the socket opening in assembled relation therein, and a spring collar device embracing the hub sections to urge the same to firm, gripping connected engagement with the shaft, said spring collar device serving to bolster the plastic material of the hub sections and maintain said flat side wall of the socket opening in clamping engagement with the flat face of the shaft thereby preventing looseness and play in the connection incident to strain taking place therein.

4. Means for non-rotatably connecting a knob or like body member to a shaft formed with a flat side face, comprising a hub member provided on said knob and having a socket opening receiving the shaft, and retaining means comprising a spring collar embracing said hub member and a cross-piece disposed in the socket opening to present a flat side wall therein, said flat side wall being adapted to cooperate with the flat side face of the shaft in rigid, non-rotatable engagement therewith in assembled relation.

GEORGE A. TINNERMAN.